(12) United States Patent
Bharat et al.

(10) Patent No.: US 10,387,507 B2
(45) Date of Patent: *Aug. 20, 2019

(54) SYSTEMS AND METHODS FOR PERSONALIZING AGGREGATED NEWS CONTENT

(71) Applicant: Google LLC, Mountain View, CA (US)

(72) Inventors: Krishna Bharat, Palo Alto, CA (US); Michael Schmitt, Zurich (CH); Michael Curtiss, Mountain View, CA (US); Marissa Mayer, Palo Alto, CA (US); Kerah Cottrell, Mountain View, CA (US); Brian Rakowski, Mountain View, CA (US); Anurag Acharya, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1273 days.

This patent is subject to a terminal disclaimer.

(21) Appl. No.: 14/215,100

(22) Filed: Mar. 17, 2014

(65) Prior Publication Data

US 2014/0201204 A1 Jul. 17, 2014

Related U.S. Application Data

(63) Continuation of application No. 10/748,663, filed on Dec. 31, 2003, now Pat. No. 8,676,837.

(51) Int. Cl.
*G06F 16/9535* (2019.01)

(52) U.S. Cl.
CPC .............................. *G06F 16/9535* (2019.01)

(58) Field of Classification Search
CPC .................................................. G06F 17/30867
See application file for complete search history.

(56) References Cited

U.S. PATENT DOCUMENTS

| | | | |
|---|---|---|---|
| 5,634,051 A | | 5/1997 | Thomson |
| 5,761,662 A | * | 6/1998 | Dasan ............... G06F 17/30067 |
| 6,098,064 A | | 8/2000 | Pirolli et al. |
| 6,363,390 B1 | * | 3/2002 | Shapiro ................. G06F 17/211 |
| 6,363,398 B1 | | 3/2002 | Andersen |
| 6,381,594 B1 | | 4/2002 | Eichstaedt et al. |
| 6,516,337 B1 | | 2/2003 | Tripp et al. |
| 6,564,251 B2 | | 5/2003 | Katariya et al. |
| 6,581,072 B1 | | 6/2003 | Mathur et al. |

(Continued)

OTHER PUBLICATIONS

Chesnais et al "The Fishwrap Personalized News System" 1995 IEEE, pp. 275-282.*

*Primary Examiner* — Mark D Featherstone
*Assistant Examiner* — Navneet Gmahl
(74) *Attorney, Agent, or Firm* — Fish & Richardson P.C.

(57) ABSTRACT

A system customizes a news document associated with a user of a news aggregation service. The system includes multiple news source servers that store news content and a remote news aggregation server. The news aggregation server creates a customized news document based on one or more personalized search queries received from a user. The news aggregation server fetches the news content from the multiple news source servers, aggregates the news content, and searches the aggregated news content based on the one or more personalized search queries. The news aggregation server provides selected news content to the customized news document based on results of the search.

20 Claims, 9 Drawing Sheets

(56) References Cited

U.S. PATENT DOCUMENTS

| | | |
|---|---|---|
| 6,643,661 B2 | 11/2003 | Polizzi et al. |
| 6,691,106 B1 | 2/2004 | Sathyanarayan |
| 6,868,525 B1 | 3/2005 | Szabo |
| 6,961,712 B1 | 11/2005 | Perkowski |
| 6,981,040 B1 | 12/2005 | Konig et al. |
| 6,990,633 B1 * | 1/2006 | Miyasaka ......... G06F 17/30867 |
| | | 707/E17.109 |
| 7,058,944 B1 | 6/2006 | Sponheim et al. |
| 7,085,944 B1 | 8/2006 | Hamilton |
| 7,181,438 B1 * | 2/2007 | Szabo ............... G06F 17/30522 |
| 7,483,871 B2 * | 1/2009 | Herz ................. G06F 17/30867 |
| 8,126,865 B1 | 2/2012 | Bharat et al. |
| 8,676,837 B2 | 3/2014 | Bharat et al. |
| 2001/0037248 A1 | 11/2001 | Klein |
| 2002/0035501 A1 | 3/2002 | Handel et al. |
| 2002/0042793 A1 * | 4/2002 | Choi ................ G06F 17/30687 |
| 2002/0073399 A1 | 6/2002 | Golden |
| 2002/0103809 A1 | 8/2002 | Starzl et al. |
| 2002/0124055 A1 | 9/2002 | Reisman |
| 2002/0184208 A1 | 12/2002 | Kato |
| 2002/0184237 A1 * | 12/2002 | McFeely ................ G06Q 10/10 |
| 2003/0009497 A1 | 1/2003 | Yu |
| 2003/0074352 A1 | 4/2003 | Raboczi et al. |
| 2003/0084048 A1 | 5/2003 | Dweck et al. |
| 2003/0084142 A1 * | 5/2003 | Casati ................. G06F 11/3495 |
| | | 709/224 |
| 2003/0093417 A1 | 5/2003 | Kagimasa et al. |
| 2004/0006743 A1 | 1/2004 | Oikawa et al. |
| 2004/0059705 A1 | 3/2004 | Wittke et al. |
| 2004/0186828 A1 * | 9/2004 | Yadav ............... G06F 17/30672 |
| 2005/0005237 A1 | 1/2005 | Rail et al. |
| 2005/0027666 A1 | 2/2005 | Beck et al. |
| 2005/0033657 A1 | 2/2005 | Herrington et al. |
| 2005/0065908 A1 | 3/2005 | Silverbrook et al. |
| 2005/0137996 A1 | 6/2005 | Billsus et al. |
| 2005/0138036 A1 | 6/2005 | Sizemore |
| 2005/0138049 A1 | 6/2005 | Linden |
| 2005/0273810 A1 * | 12/2005 | Zimmerman .......... H04N 7/163 |
| | | 725/34 |
| 2007/0156677 A1 * | 7/2007 | Szabo ............... G06F 17/30522 |
| 2013/0073390 A1 * | 3/2013 | Konig ............... G06F 17/30867 |
| | | 705/14.54 |

\* cited by examiner

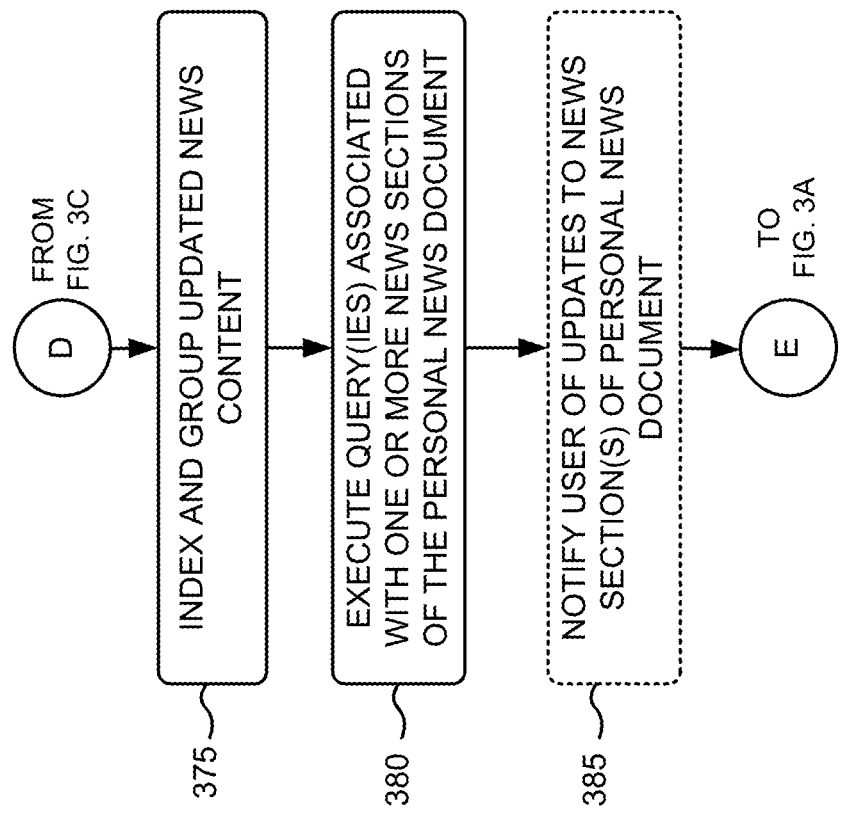

SYSTEMS AND METHODS FOR PERSONALIZING AGGREGATED NEWS CONTENT

RELATED APPLICATION

This application is a continuation of U.S. patent application Ser. No. 10/748,663, filed Dec. 31, 2003 (now U.S. Pat. No. 8,676,837), the disclosure of which is incorporated by reference herein in its entirety.

BACKGROUND OF THE INVENTION

Field of the Invention

The present invention relates generally to information aggregation systems and, more particularly, to systems and methods for personalizing news content aggregated by a news aggregation service.

Description of Related Art

Existing news aggregation services (e.g., Google News) search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. To keep abreast of developments in the news, users must periodically access the news aggregation service, re-enter a search query and view relevant news stories.

Accordingly, it would be desirable to implement a news browsing service that automatically provides news content to a user based on previously stored user search and display criteria.

SUMMARY OF THE INVENTION

Systems and methods, consistent with the principles of the invention, implement a news browsing service that may store user news content searches and use these previously stored searches to automatically, and periodically, provide a personal news document, such as, for example, a personal news web page, to the user that includes personalized news content. The personal news document may be hosted on the news aggregation server, or on a personal document server associated with the user. The user may customize the content and format of the personal news document via a user interface implemented at a server associated with the news browsing service or at a client associated with the user.

According to one aspect consistent with the principles of the invention, a method of customizing a news web page associated with a user of a news aggregation service is provided. The method includes creating the customized news web page with one or more personalized search queries received from the user. The method further includes fetching news content from multiple news source servers, aggregating the news content, and searching the aggregated news content based, at least in part, on the one or more personalized search queries. The method also includes providing selected news content to the customized news web page based, at least in part, on results of the search.

According to another aspect, a method of creating a personalized news document is provided. The method includes receiving multiple search queries from a user and creating a customized news document including multiple personalized news sections, with each news section being associated with a different one of the multiple search queries. The method further includes retrieving news content from memory using the multiple search queries and inserting selected news content of the retrieved news content into each of the personalized news sections of the customized news document.

According to a further aspect, a method of providing news content to a personalized news document via a news aggregation server is provided. The method includes associating multiple search queries with a user and maintaining the multiple search queries in a memory associated with the news aggregation server. The method further includes periodically searching aggregated news content using the multiple search queries and periodically providing selected news content to a news document associated with the user using results, from the periodic searches of the aggregated news content.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A, 3B, 3C and 3D are flowcharts of exemplary processing for creating and updating personalized news documents according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a news browsing service that stores user news content searches and uses these previously stored searches to automatically, and periodically, provide a personal news document, such as, for example, a personal news web page, to the user that includes personalized news content. The content and format of the personal news document may be customized by the user.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

Exemplary Network Configuration

Figure 1:
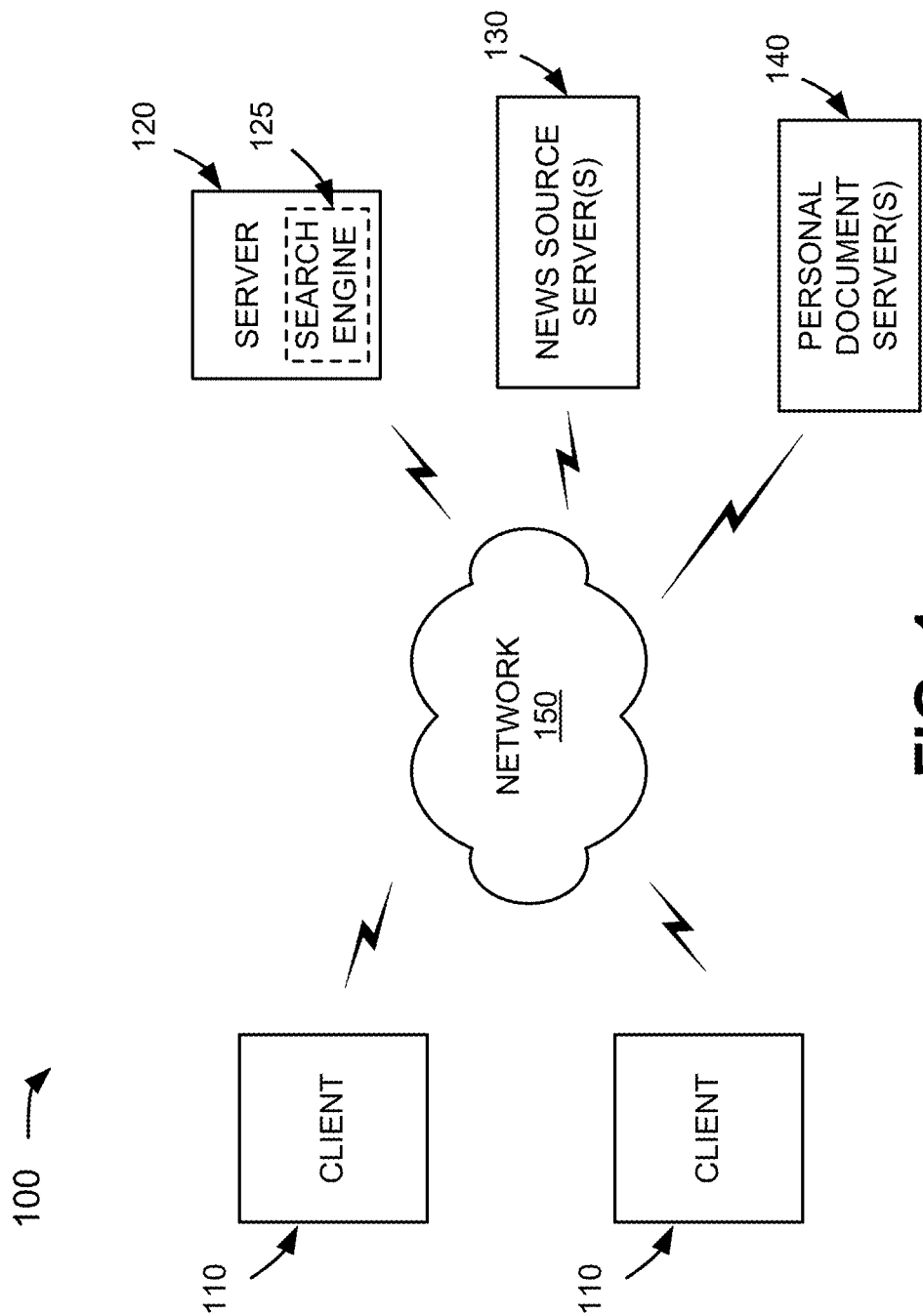
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by users at clients 110. Server 120 may implement a news aggregation service by crawling a corpus of news content documents (e.g., web pages) hosted on news source server(s) 130 and store information associated with these news content documents in a repository of crawled documents. Server(s) 130 may store or maintain news content documents that may be crawled by server 120. Such news content documents may include recently published news stories, or older (i.e., not recent), archived news stories. Personal document server(s) 140 may host documents for various users associated with clients 110. Such documents may include content customized by each individual user.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
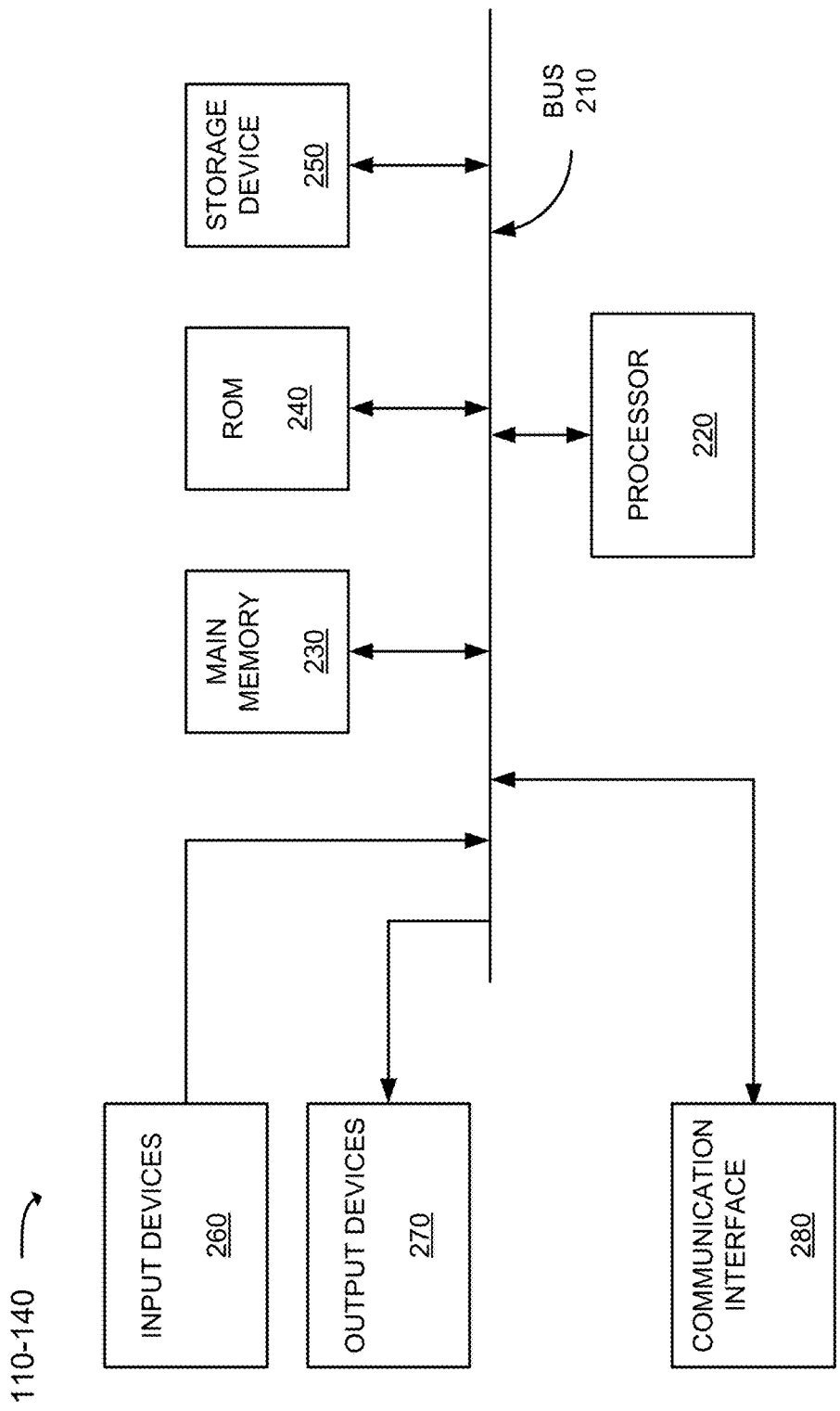
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more types of conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, performs certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A, 3B, 3C and 3D are flowcharts of exemplary processing for creating and updating personalized newspaper documents according to an implementation consistent with the principles of the invention. As one skilled in the art will appreciate, the processing exemplified by FIGS. 3A, 3B, 3C and 3D can be implemented in software and stored on a computer-readable memory, such as main memory 230, ROM 240 or storage device 250 of server 120. Alternatively, the processing exemplified by FIGS. 3A, 3B, 3C and 3D can be implemented in hardwired circuitry, such as combinational logic, within server 120.

Figure 3A:
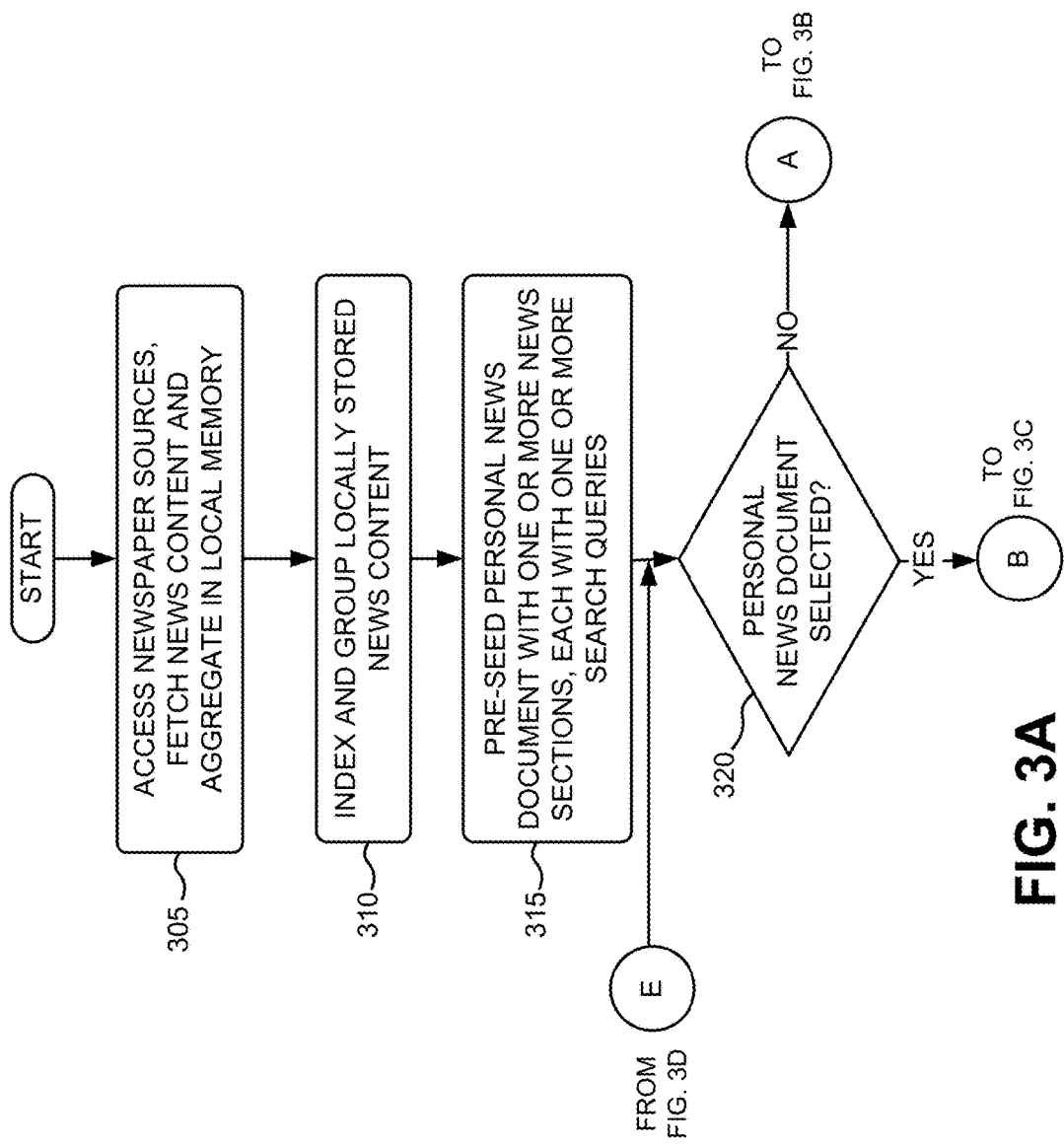

Processing may begin with server 120 accessing external news content (e.g., from server 130), fetching the news content and aggregating the fetched news content in a local memory (act 305)(FIG. 3A). For example, server 120 may use a news crawler (e.g., web robot) that may access news content documents hosted by news source server(s) 130. News source server(s) 130 may host, for example, news content from the Washington Post, the New York Times, or other news content sites. The fetched news content may then be indexed and grouped, using conventional indexing and grouping algorithms (act 310).

Server 120 may pre-seed a personal news document with one or more news sections, with each of the news sections including one or more search queries (act 315). The personal news page may include, for example, a personal news web page and may be stored on server 120 or server 140. A number of search queries may be supported by server 120, including the following search query forms: (a) one or more keywords (e.g., 'bush,' bush iraq,' etc.); (b) topical categories (e.g., 'topic=sports,' 'topic=sport-basketball'); (c) geographical categories (e.g., 'geo=usa,' 'geo=north america,' 'geo=china'); and/or (d) combinations of the above (e.g., 'tennis topic=sports', geo=europe'). For example, a personal "wireless" news section can be seeded with two queries: 'wireless topic=science' and 'cell phone topic=technology.' A search query may, thus, include a combination of one or more of the query forms above. Each of the news sections of the personal news document may be defined by an associated query.

Figure 3B:
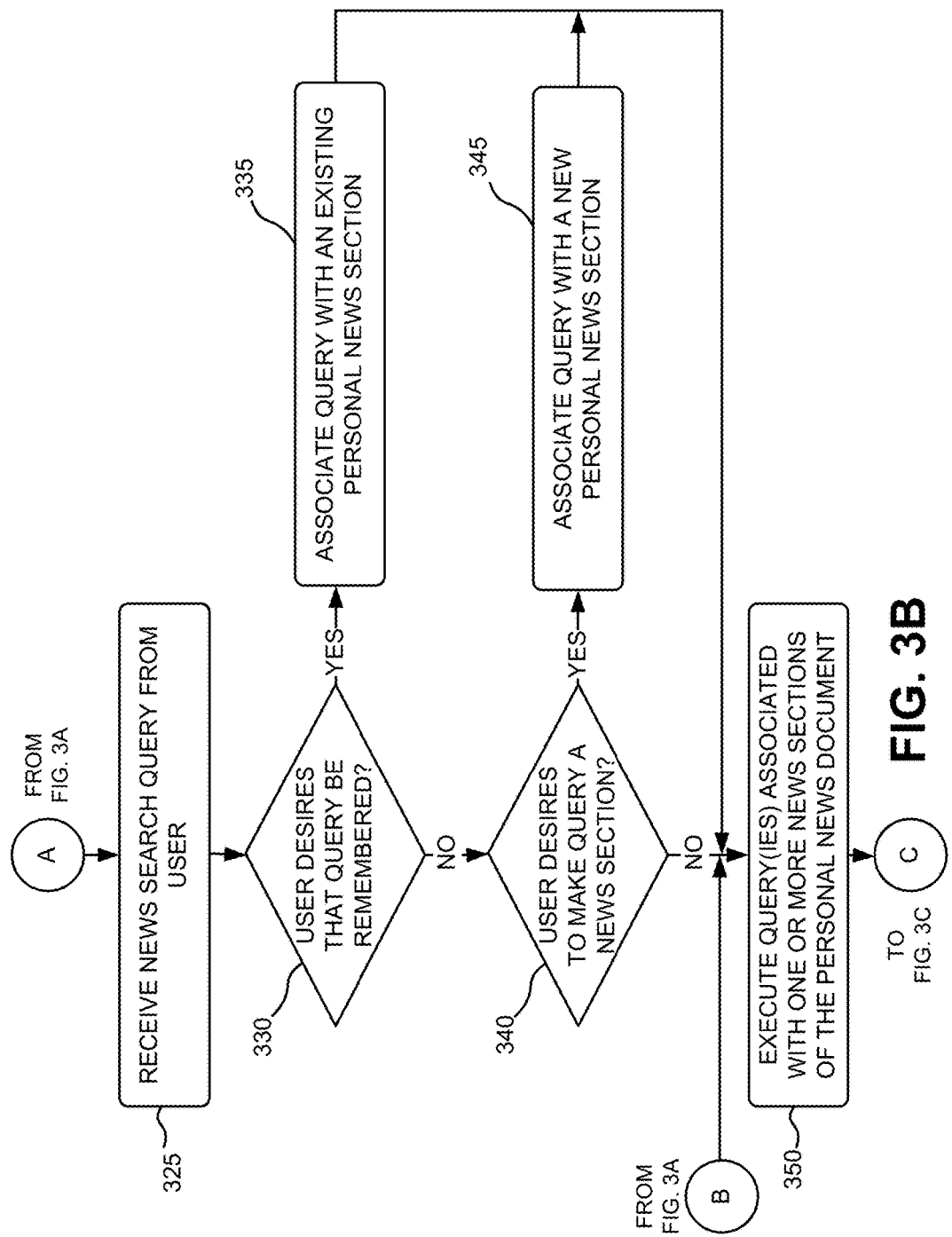
Figure 4:
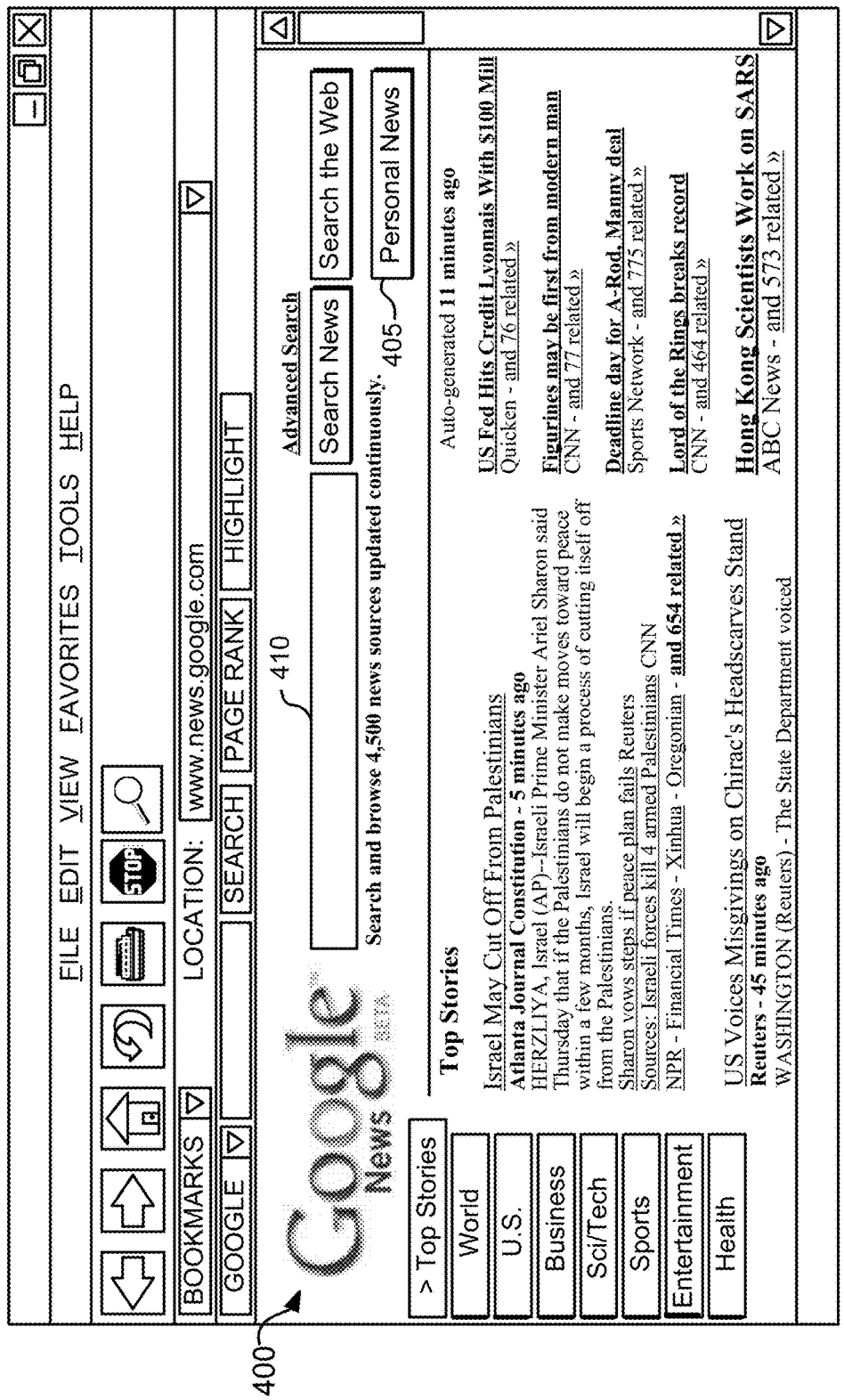
FIG. 4 is a diagram of an exemplary news aggregation search page according to an implementation consistent with the principles of the invention.
Figure 5:
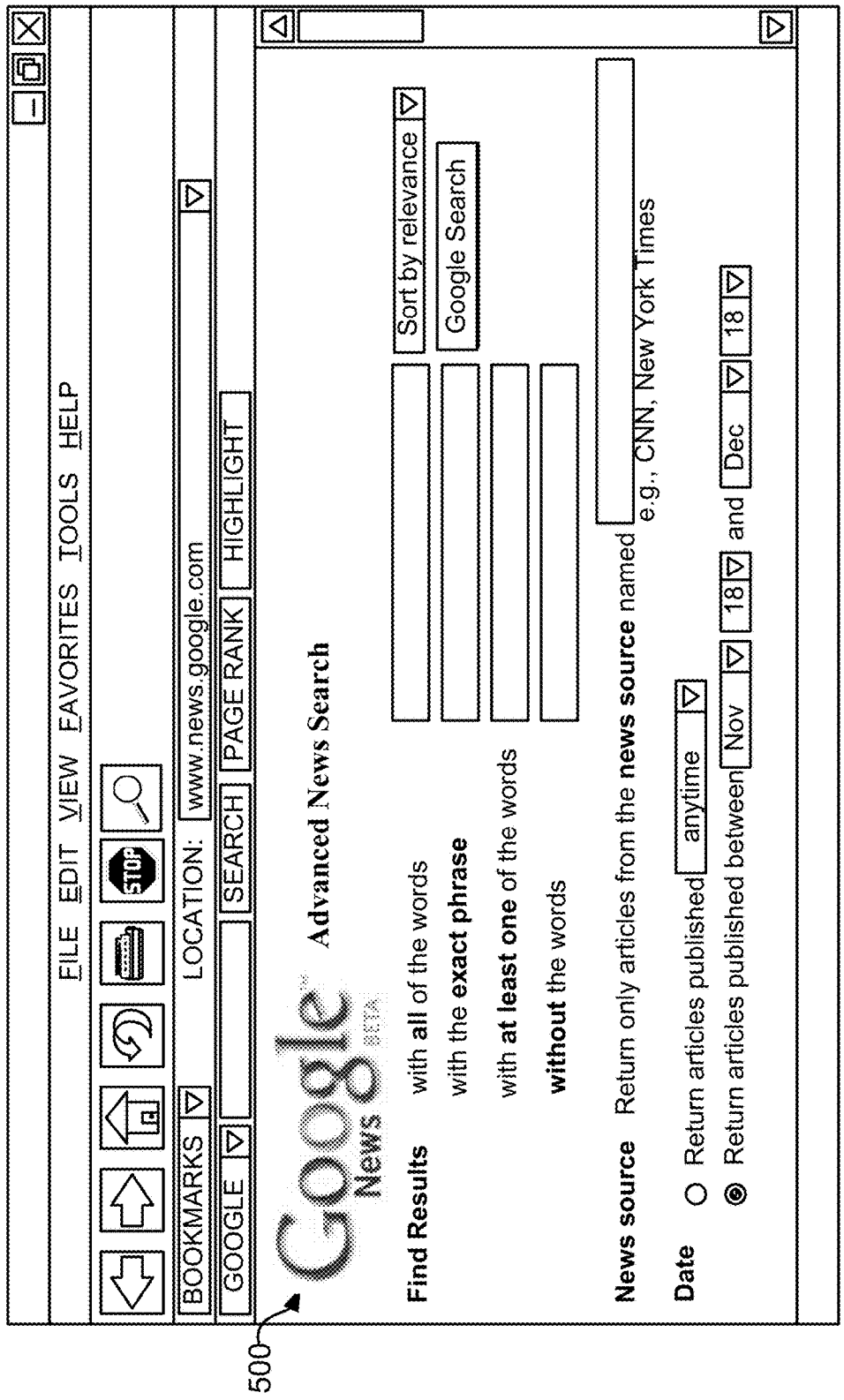
FIG. 5 is a diagram of an exemplary news aggregation advanced search page according to an implementation consistent with the principles of the invention.

Server 120 may determine whether a user, associated with a client 110, has selected his/her personal news document (act 320). For example, as shown in FIG. 4, a user may "click" on the "personal news" button 405 of a news search page 400 of a news aggregation service associated with server 120 to select his/her personal news document. If the user has selected his/her personal news document, processing may continue at act 350 (FIG. 3B). If not, server 120 may then receive a news search query from a user (act 325). For example, as shown in FIG. 4, a user may enter, in news search page 400, text in a search field 410. In another implementation, as shown in FIG. 5, a user may enter search text in a secondary "advanced news search" page 500 that may be readable from search page 400. Search page 500 may include various advanced search features that permit, for example, the user to search for news content based on publication date, exact phrases contained in the news content, etc. Furthermore, queries deployed by the user in the past may be ranked based on recency and frequency and made accessible through a menu placed on the search page. Selecting such a search query may reissue the query and generate a new news section. This list of queries can be automatically laid out as a newspaper with many sections distributed over many pages.

Server 120 may determine whether the user desires that the received search query be remembered (act 330). For example, server 120 may prompt the user with "Do you want to remember this search?" If the user desires that the received search query be remembered, server 120 may associate the search query with an existing news section of a personal news document associated with the user (act 335). If the user does not desire the received search query to be remembered, then server 120 may determine whether the user desires to make the received search query into a news section of the personal news document associated with the user (act 340). For example, server 120 may prompt the user with "Do you want to make this search a section?" If so, server 120 may associate the received search query with a new news section of the personal news document associated with the user (act 345). If the user does not desire to make the received search query into a news section, then server 120 may execute the queries associated with each of the one or more news sections of the user's personal news document (act 350). The results of the executed queries may be merged based on scores computed by search engine 125 to produce a final ranking which may form entries in the user's news sections.

Figure 3C:
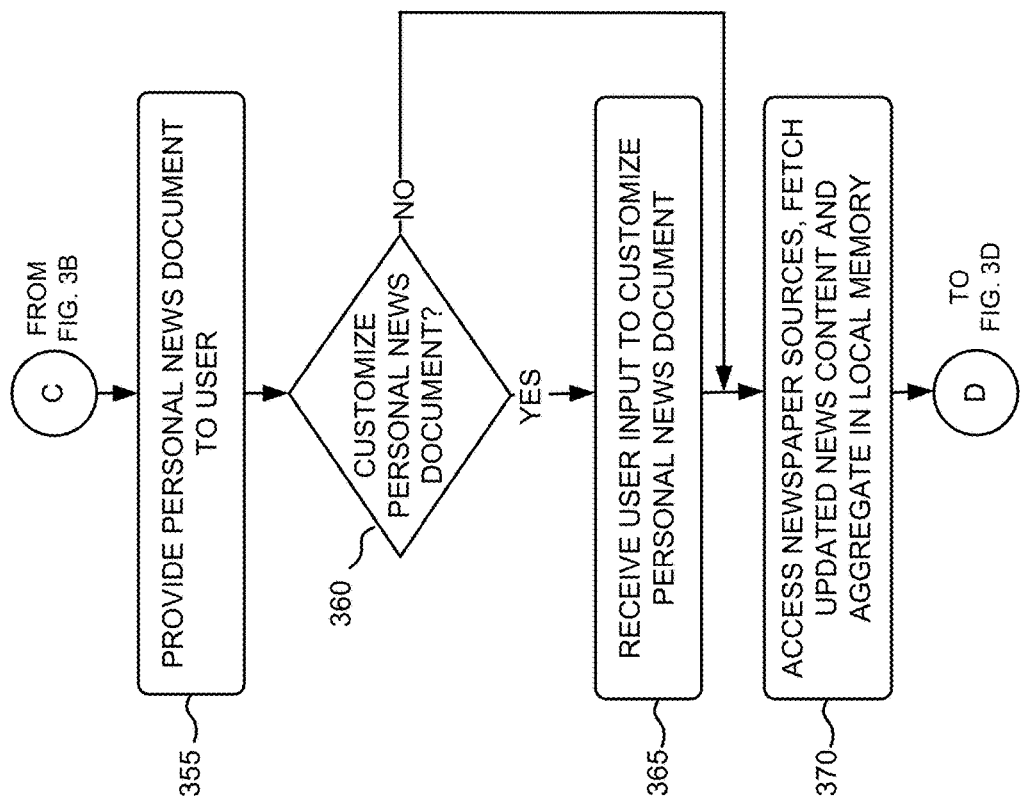
Figure 6:
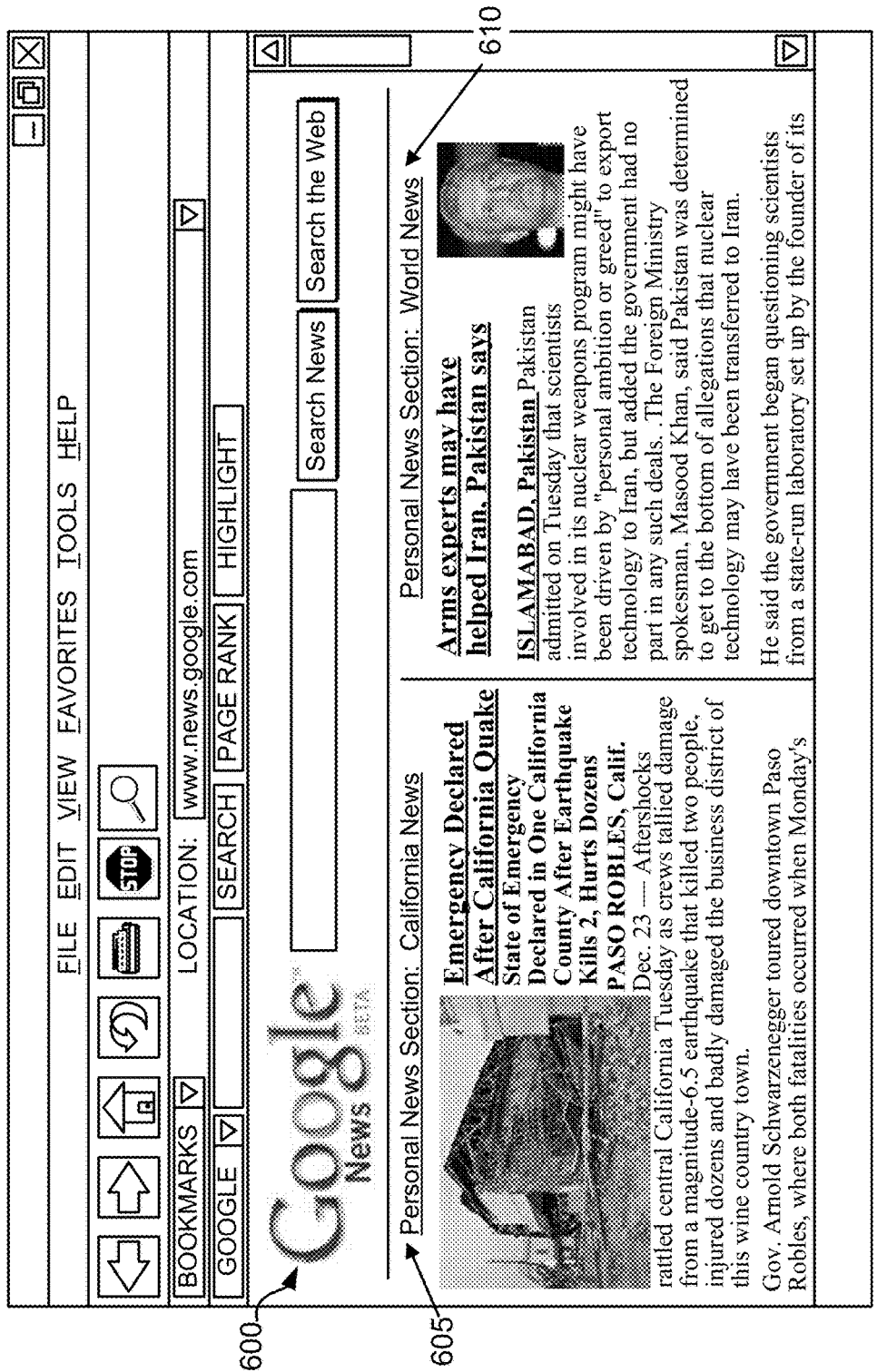
FIG. 6 is a diagram of an exemplary personal news document according to an implementation consistent with the principles of the invention.

Server 120 may then provide the user's personal news document to the user (act 355)(FIG. 3C). If server 120 hosts the user's personal news document, then server 120 may send one or more documents to the user containing the user's personal news document. If the user's personal news document is hosted on personal document server 140, then server 120 may send one or more documents to server 140 containing the user's personal news document. Server 120 may, additionally, direct the user's web browser to the documents hosted on server 140. The user's personal news document may be formatted similar to a human-compiled newspaper, with a title, short introduction, related story titles, data, photo, etc. By way of example, FIG. 6 illustrates a personal news document 600 that includes two news sections 605 and 610, "California News" and "World News," respectively. The user's personal news document may additionally be used to produce a similarly configured print newspaper in a viewable or hard copy format. For example, a postscript or pdf file may be produced that is portable for viewing and ready to print for offline reading. In one implementation, the layout of the print newspaper may be separately specified from the personal news document hosted on either servers 120 or 140.

Server 120 may determine whether the user desires to customize his/her personal news document (act 360). If not, processing may continue at act 370. If the user does desire to customize his/her personal news document, then server 120 may receive input from the user to customize the personal news document associated with the user (act 365). An interactive program (known as a Wizard) may execute at server 120, or at the client 110 associated with the user, to walk the user through the process of adding news sections, placing them appropriately, and customizing their look and feel.

In one implementation consistent with the principles of the invention, users may customize their personal news document in various ways, including the following: (a) adding a new section seeded with new queries; (b) changing the appearance or location of a news section or the queries associated with a news section; (c) moving news sections around (e.g., from top left of news page to bottom right, from 2 columns to 1 column layout, etc.); (d) deleting a news section; (e) changing display properties for news within a news section (e.g., deciding how many stories the news section should have, how many related titles within a story, whether images should be shown, etc.); and (f) changing ranking properties within a news section. When changing ranking properties within a news section, the user may decide how freshness of the news content should be valued, such as, for example, sorting news content by time, by importance, or by some combination, or by providing hints for ranking certain types of stories above other stories. Additionally, the user may indicate that a certain kind of news source (e.g., New York Times, sources in USA, etc.) may be preferred or not preferred. Also, the user may provide general keywords that are of interest to the user (e.g., San Francisco) and stories with these keywords should be boosted. Further, the user can list journalists they like or do not like or genres they like or do not like (e.g., opinion/commentary vs. breaking news vs. briefs vs. full coverage).

Those skilled in the art will appreciate that various combinations of the above customization options/parameters, or other customization options/parameters, may be provided in other implementations consistent with the principles of the invention. Those skilled in the art can further devise user interfaces that allow such preferences to be expressed either in the context of one particular news section, or all news sections together. Various user preferences (e.g., selected options/parameters) for customizing a personal news document may be stored at server 120, server 140, or at a client 110 associated with the user, or at some combination of server 120, server 140, or client 110. To access the user preference(s), a "cookie," or an identifier contained in a "cookie" that is, in turn, mapped to the stored user preferences, may be used in some implementations consistent with the principles of the invention. During the personal news document customization process, a user may make their personal news document available to other users through a registry where personal news documents are registered. Other users may then search this registry and view and copy news sections that other users have created.

Server 120 may access external news content (e.g., from server 130), fetch updated news content and aggregate the updated news content in local memory (act 370). For example, server 120 may use a news crawler (e.g., web robot) that may access updated news content documents hosted by news source server(s) 130. The fetched updated news content may be indexed and grouped, using conventional indexing and grouping algorithms (act 375)(FIG. 3D). Server 120 may then, periodically, execute a query(ies) associated with one or more news sections of the user's personal news document (act 380). Server 120 may, optionally, notify the user of any updates to news sections of the user's personal news document based on the result of the executed search of the updated news content (act 385). Server 120 may implement a news alert service that may notify the user via, for example, a page, an e-mail, a FAX, or a telephone call, that their personal news document has been updated. The user may be notified at stipulated intervals, or only when updated news content for their personal news document exists. The notification from server 120 may include the actual news updates (e.g., an e-mail may include a summary of an updated news story), or the notification may only include a brief textual or oral notification that the user can access their personal news document to retrieve the updated news content. Processing may then return to act 320 (FIG. 3A) to determine if the user has again selected his/her personal news document.

CONCLUSION

Systems and methods consistent with the principles of the invention may use previously stored user searches to automatically, and periodically, provide a personal news document to the user that includes personalized news content. The user may customize the content and format of the personal news document via a user interface implemented at a server associated with the news browsing service, or at a client associated with the user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A, 3B, 3C and 3D, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

What is claimed is:

1. A method comprising:
   creating, by one or more processors, a news document including news sections associated with search queries, each news section associated with a different query of the search queries;
   identifying, by the one or more processors, a first item of news content from indexed news content using the search queries and adding the first item of news content in a first news section of the news document;
   providing, by the one or more processors, the news document with the added first item of news content for display;
   ranking the search queries based on recency and frequency of the search queries;
   identifying, from the search queries, a past query deployed by a user;
   identifying a first search query from the search queries based on the ranking and the past query deployed by the user;
   determining, by the one or more processors, a particular news section of the news document that is associated with the identified first search query;
   modifying, by the one or more processors, the news document to include a second item of news content in the particular news section to reflect an update of the first item in the particular news section without user intervention; and
   providing, by the one or more processors, the modified news document for display.

2. The method of claim 1, further comprising:
   receiving information regarding a ranking of the first news section of the news sections, the information being associated with at least one of:
      a freshness of the news content,
      a preference for a type of news source,
      a preference for a type of news story,
      one or more keywords of interest,
      a preference for a particular journalist, or
      a preference for a particular genre of news, and
      where, when modifying the news document to include the second item of news content, the method includes:
         using the received information to modify the news document.

3. The method of claim 1, further comprising:
   receiving a request to customize the news document;
   the request being associated with at least one of:
      adding a second news section to the news document,
      changing an appearance or a location of the first news section, of the news sections, in the news document, or
      removing the first news section, of the news sections, from the news document.

4. The method of claim 1, further comprising:
   providing a notification of updated content associated with at least one of the news sections.

5. The method of claim 1, further comprising:
receiving a first input relating to one or more display properties associated with the particular news section of the news sections; and
receiving a second input relating to a ranking criterion associated with the particular news section,
the one or more display properties and the ranking criterion for the particular news section being different than one or more display properties and a ranking criterion for another news section of the news sections,
where, when modifying the news document, the method includes:
modifying the news document based on the received first input and the received second input.

6. The method of claim 1, further comprising
receiving a new search query;
receiving an indication that the new search query should be saved; and
associating, based on the indication that the new search query should be saved, the new search query with one of the news sections.

7. The method of claim 1, further comprising:
receiving a new search query;
receiving an indication that the new search query should be associated with an additional news section of the news document; and
creating, based on the indication that the new search query should be associated with the additional news section of the news document, the additional news section within the news document.

8. A system comprising:
one or more processors to:
create a news document including news sections associated with search queries, each news section associated with a different query of the search queries;
identify a first item of news content from indexed news content using the search queries and add the first item of news content in a first news section of the news document;
provide the news document with the added first item of news content for display;
rank the search queries based on recency and frequency of the search queries;
identify, from the search queries, a past query deployed by a user;
identify a first search query from the search queries based on the ranking and the past query deployed by the user;
determine, a particular news section of the news document that is associated with the identified first search query;
modify the news document to include a second item of news content in the particular news section to reflect an update of the first item in the particular news section without user intervention; and
provide the modified news document for display.

9. The system of claim 8, where the one or more processors are further to:
receive information regarding a ranking of the first news section of the news sections,
the information being associated with at least one of:
a freshness of the news content,
a preference for a type of news source,
a preference for a type of news story,
one or more keywords of interest,
a preference for a particular journalist, or
a preference for a particular genre of news, and
the one or more processors, when modifying the news document to include the second item of news content, are further to:
use the received information to modify the news document.

10. The system of claim 8, where the one or more processors are further to:
receive a request to customize the news document;
the request being associated with at least one of:
adding a second news section to the news document,
changing an appearance or a location of the first news section, of the news sections, in the news document, or
removing the first news section, of the news sections, from the news document.

11. The system of claim 8, where the one or more processors are further to:
provide a notification of an update to content associated with at least one of the news sections.

12. The system of claim 8, where the one or more processors are further to:
receive a first input relating to one or more display properties associated with the particular news section of the news sections; and
receive a second input relating to a ranking criterion associated with the particular news section,
the one or more display properties and the ranking criterion for the particular news section being different than one or more display properties and a ranking criterion for another news section of the news sections,
where the one or more processors, when modifying the news document, are further to:
modify the news document based on the received first input and the received second input.

13. The system of claim 8, where the one or more processors are further to:
receive a new search query;
receive an indication that the new search query should be saved; and
associate, based on the indication that the new search query should be saved, the new search query with one of the news sections.

14. The system of claim 8, where the one or more processors are further to:
receive a new search query;
receive an indication that the new search query should be associated with an additional news section of the news document; and
create, based on the indication that the new search query should be associated with the additional news section of the news document, the additional news section within the news document.

15. A non-transitory computer-readable medium storing instructions, the instructions comprising:
one or more instructions which, when executed by one or more processors, cause the one or more processors to:
create a news document including news sections associated with search queries, each news section associated with a different query of the search queries;
identify a first item of news content from indexed news content using the search queries and add the first item of news content in a first news section of the news document;
provide the news document with the added first item of news content for display;
rank the search queries based on recency and frequency of the search queries;

identify, from the search queries, a past query deployed by a user;

identify a first search query from the search queries based on the ranking and the past query deployed by the user;

determine a particular news section of the news document that is associated with the identified first search query;

modify the news document to include a second item of news content in the particular news section to reflect an update of the first item in the particular news section without user intervention; and provide the modified news document for display.

16. The non-transitory computer-readable medium of claim 15, where the instructions further include:

one or more instructions to receive an input relating to a ranking criterion associated with the particular news section;

one or more instructions to modify the news document based on the ranking criterion; and where the ranking criterion includes information associated with at least one of:
a freshness of the news content,
a preference for a type of news source,
a preference for a type of news story,
one or more keywords of interest,
a preference for a particular journalist, or
a preference for a particular genre of news.

17. The non-transitory computer-readable medium of claim 15, where the instructions include:

one or more instructions to receive a request to change information associated with at least one of:
a quantity of news stories within the particular news section,
a quantity of titles associated with a news story within the particular news section, or
a quantity of images included in the news story.

18. The non-transitory computer-readable medium of claim 15, where the instructions further include:

one or more instructions to provide a notification of an update to content associated with at least one of the news sections.

19. The non-transitory computer-readable medium of claim 15, where the instructions further include:

one or more instructions to receive a new search query;

one or more instructions to receive an indication that the new search query should be saved; and one or more instructions to associate, based on the indication that the new search query should be saved, the new search query with one of the news sections.

20. The non-transitory computer-readable medium of claim 15, where the instructions further include:

one or more instructions to receive a new search query;

one or more instructions to receive an indication that the new search query should be associated with an additional news section of the news document; and one or more instructions to create, based on the indication that the new search query should be associated with the additional news section of the news document, the additional news section within the news document.

* * * * *